Nov. 2, 1926.  
J. L. HITE  
1,605,186  
POLISH ROD CARRIER  
Filed April 21, 1924
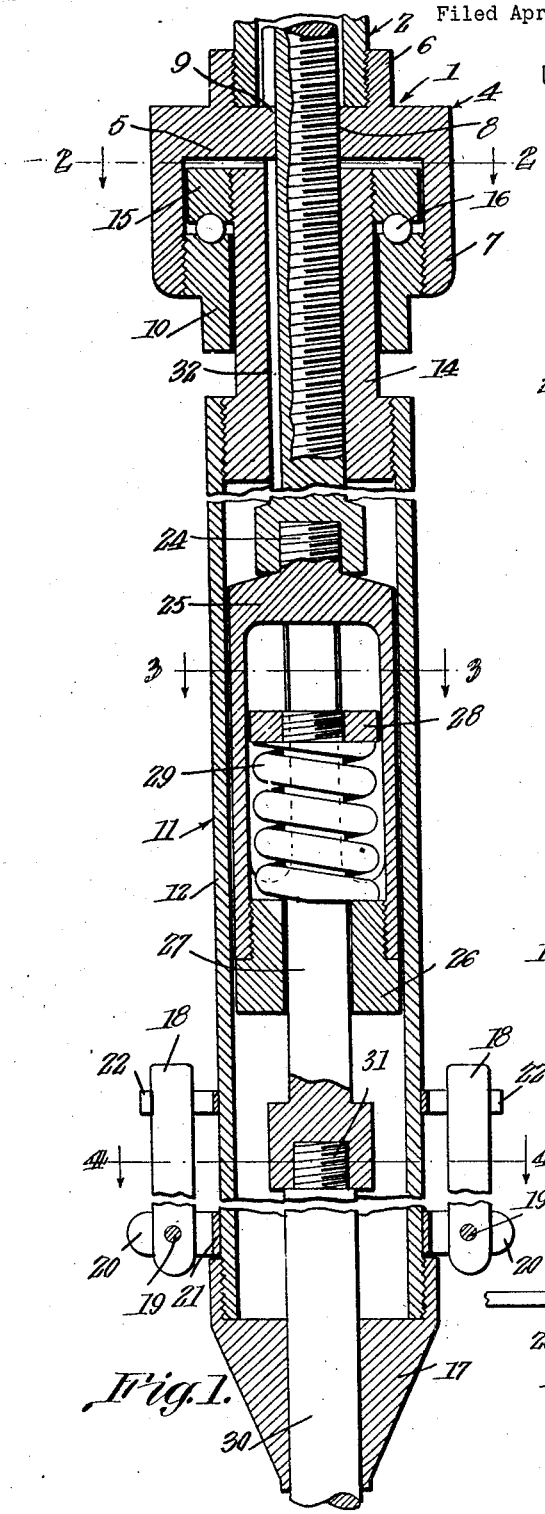
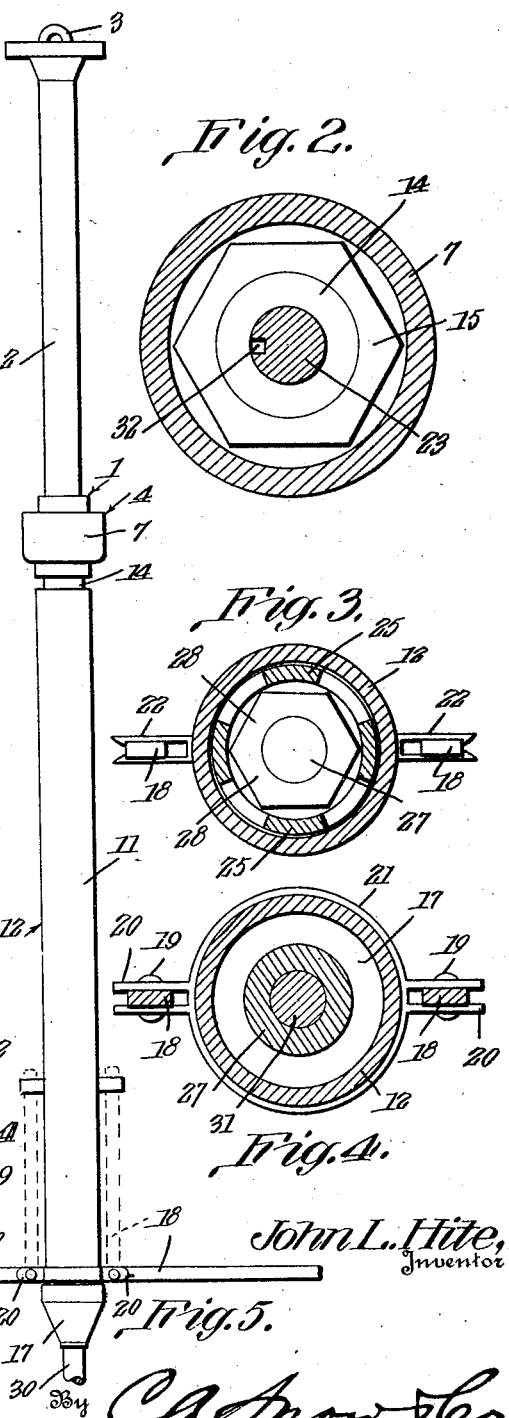

Patented Nov. 2, 1926.

1,605,186

UNITED STATES PATENT OFFICE.

JOHN LYNN HITE, OF BEGGS, OKLAHOMA.

POLISH-ROD CARRIER.

Application filed April 21, 1924. Serial No. 708,025.

This invention aims to provide novel means whereby a polish rod in a well rig may be adjusted vertically and be supported yieldably.

It is within the province of the disclosure to improve generally and to enhance the utility of devices of that sort to which the invention appertains.

Although a preferred form has been shown, it will be understood that a mechanic, working within the scope of what is claimed, may make changes in the form selected for illustration, without departing from the spirit of the invention.

In the drawing:—Figure 1 shows in longitudinal section, a device constructed in accordance with the invention, parts being broken away; Figures 2, 3 and 4 are cross sections taken, respectively, on the lines 2—2, 3—3, and 4—4 of Figure 1; Figure 5 is an elevation showing the complete article.

In carrying out the invention, there is provided a suspension member 1, which is a composite structure, including a tube 2, provided at its upper end with any suitable means 3 whereby the suspension member may be mounted on a walking beam (not shown). The foot 4 of the suspension member 1 may embody a disk 5 having an upstanding collar 6 and a depending annular flange 7, the tube 2 being threaded into the collar 6. The disk 5 of the foot 4 has a central opening 8 and is provided with a projection or key 9 extending into the opening 8. A support 10, in the form of a ring, is threaded into the annular flange 7 of the foot 4.

The device includes a casing 11 mounted on the suspension member 1 for rotation and held thereon against appreciable longitudinal movement. The casing 11 comprises a tubular body 12, a coupling 14 being secured, by threading or otherwise, in the upper end of the body. The coupling 14 is rotatable in the support 10 of the suspension member 1. At its upper end, the coupling 14 carries a flange located within the part 7 of the suspension member 1, the flange being, if desired, in the form of a nut 15 threaded on the upper end of the coupling 14. Balls 16 are disposed between the flange 15 of the coupling 14 and the ring 10 of the suspension member 1, and, thus, the casing 11 is supported anti-frictionally, for rotation, on the suspension member 1. A tapered foot 17 is threaded upon or secured otherwise to, the lower end of the tubular body 12. Handles 18 are secured pivotally to the body 12, in any desired way. If preferred the handles 18 may be mounted on pivotal elements 19 carried by the outstanding ears 20 of a collar 21 secured to the body 12 near to the lower end thereof, the handles 18 being adapted to swing parallel to the axis of the casing 11, into and out of engagement with latches 22 mounted on the tubular body 12 above the pivotal supports 19 for the handles.

The numeral 23 marks a screw slidable freely in the tube 2 of the suspension member 1 and in the opening 8 of the foot 4 of the suspension member, the screw being threaded into the coupling portion 14 of the casing 11. The lower end of the screw 23 is threaded or connected otherwise as shown at 24, with a cage 25, a bearing 26 being threaded into the lower end of the cage.

A plunger 27 is slidably mounted in the bearing 26 and is provided at its upper end with a nut 28, or other abutment, a compression spring 29 surrounding the upper portion of the plunger, one end of the spring engaging the abutment nut 28, and the other end of the spring engaging the bearing 26 wherein the plunger 27 slides. The polish rod 30 is slidable in the foot 17 of the casing 11 and is threaded at 31 into the lower end of the plunger 27. Referring particularly to Figures 1 and 2, it will be observed that the screw 23 has a longitudinal groove 32 receiving the projection or key 9 of the foot 4 of the suspension member 1.

In practical operation, the handles 18 may be swung downwardly, out of engagement with the latches 22, into the outstanding position shown in solid line in Figure 5, and, by means of the handles, the entire casing 11 may be rotated, longitudinal movement being imparted to the screw 23, because the screw is threaded into the coupling 14 of the casing 11, and because the key 9 of the suspension member 1 is received in the longitudinal groove 32 of the screw, the screw thus being held against rotation. When the screw 23 is moved longitudinally, the polish rod 30 will be adjusted vertically. The spring 29 serves as a cushion, supporting the polish rod 30 yieldably, and acting as a shock absorber, should the polish rod happen to bump against the bottom of the well.

I claim:—

In a device of the class described, a suspension member, a tubular casing supported for rotation on the suspension member, a screw threaded into the casing and provided with means housed within the casing for connecting the screw to a polish rod, and a key and groove connection between the screw and the suspension member and holding the screw for longitudinal movement with respect to the suspension member and against rotation with respect to the suspension member.

In testimony that I claim the foregoing as my own, I have hereto affixed my signature.

JOHN LYNN HITE.